United States Patent
Kajio et al.

(10) Patent No.: US 10,053,176 B2
(45) Date of Patent: Aug. 21, 2018

(54) FUEL TANK STRUCTURE FOR MOTORCYCLE

(71) Applicant: Kawasaki Jukogyo Kabushiki Kaisha, Kobe-shi, Hyogo (JP)

(72) Inventors: Ryuji Kajio, Akashi (JP); Takeshi Kashihara, Rayong (TH); Satoshi Morotomi, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 12 days.

(21) Appl. No.: 15/287,107

(22) Filed: Oct. 6, 2016

(65) Prior Publication Data

US 2017/0113750 A1    Apr. 27, 2017

(30) Foreign Application Priority Data

Oct. 21, 2015    (JP) .................................. 2015-206974

(51) Int. Cl.
| | |
|---|---|
| B62J 35/00 | (2006.01) |
| B62J 17/00 | (2006.01) |
| B62K 11/04 | (2006.01) |
| B60K 15/03 | (2006.01) |

(52) U.S. Cl.
CPC .............. *B62J 35/00* (2013.01); *B60K 15/03* (2013.01); *B62J 17/00* (2013.01); *B62K 11/04* (2013.01)

(58) Field of Classification Search
CPC  B62J 17/00; B62J 35/00; B62K 11/02; B62K 11/04; B60K 15/03; B60K 2015/03407
See application file for complete search history.

(56) References Cited

U.S. PATENT DOCUMENTS

| | | | |
|---|---|---|---|
| 2013/0161970 A1* | 6/2013 | Takasu | B62D 27/023 296/29 |
| 2014/0131130 A1* | 5/2014 | Ozaki | B62K 11/04 180/291 |
| 2014/0202782 A1* | 7/2014 | Tsukui | B60K 11/08 180/68.1 |
| 2014/0230544 A1* | 8/2014 | Kato | G01F 23/263 73/304 C |
| 2014/0290769 A1* | 10/2014 | Nishida | B60K 15/03006 137/565.17 |
| 2015/0053495 A1* | 2/2015 | Nishida | B62J 37/00 180/219 |
| 2015/0059423 A1* | 3/2015 | Nishida | B62J 35/00 70/255 |
| 2015/0083511 A1* | 3/2015 | Kono | B62J 35/00 180/227 |

(Continued)

FOREIGN PATENT DOCUMENTS

WO    WO2013/179703    12/2014

*Primary Examiner* — Joseph M Rocca
*Assistant Examiner* — Maurice L Williams (57) ABSTRACT

A fuel tank of a motorcycle is disposed between a head pipe and a rider's seat. A cylindrical body forming a filler port is disposed at an upper portion of a tank main body of the fuel tank. A first mounting portion is formed on an outer peripheral surface of the cylindrical body projecting from the upper portion of the tank main body. A tank upper portion cover is mounted on the first mounting portion so as to cover an upper portion of the fuel tank.

5 Claims, 7 Drawing Sheets

(56) References Cited

U.S. PATENT DOCUMENTS

| | | | |
|---|---|---|---|
| 2015/0083512 A1* | 3/2015 | Maeda | B62J 17/00 180/229 |
| 2015/0166137 A1 | 6/2015 | Yamazaki et al. | |
| 2015/0258888 A1* | 9/2015 | Kunisada | B62J 35/00 220/562 |
| 2015/0266532 A1* | 9/2015 | Horiuchi | B62J 23/00 296/78.1 |
| 2016/0001652 A1* | 1/2016 | Mizukura | B60K 15/0406 220/562 |
| 2016/0075392 A1* | 3/2016 | Kunisada | B62J 23/00 180/315 |
| 2016/0137249 A1* | 5/2016 | Sasage | B62J 6/18 180/219 |
| 2016/0229476 A1* | 8/2016 | Yasuta | B62J 15/00 |
| 2016/0280301 A1* | 9/2016 | Inoue | B62J 35/00 |
| 2016/0288853 A1* | 10/2016 | Ishii | B62J 17/00 |

* cited by examiner

FUEL TANK STRUCTURE FOR MOTORCYCLE

CROSS REFERENCE TO THE RELATED APPLICATION

This application is based on and claims Convention priority to Japanese patent application No. 2015-206974, filed Oct. 21, 2015, the entire disclosure of which is herein incorporated by reference as a part of this application.

BACKGROUND OF THE INVENTION

Field of the Invention

The present invention relates to a fuel tank structure for a motorcycle which is disposed between a head pipe and a seat.

Description of Related Art

A fuel tank of a motorcycle has been known in which an upper side and outer lateral sides of the fuel tank are covered with a tank cover (e.g., WO2013/179703). In such a motorcycle, since the fuel tank is not exposed to the outside, the fuel tank does not need to be produced as a design component for good appearance, and therefore, the degree of freedom in designing the fuel tank improves. Specifically, the fuel tank can be formed in a complicated shape by joining a plurality of members.

A cylindrical filler port is provided at an upper portion of the fuel tank. In the case of forming a fuel tank by joining a plurality of members, it is difficult to form a cylindrical body having a high degree of roundness. In addition, mounting of a tank cover for covering an upper portion of the fuel tank including the cylindrical body has been also a problem.

SUMMARY OF THE INVENTION

It is an object of the present invention to provide a fuel tank structure for a motorcycle which allows a tank cover to be easily mounted while a desired degree of roundness of a filler port is ensured.

In order to achieve the above-described object, a fuel tank structure for a motorcycle according to the present invention is disposed between a head pipe and a seat, and includes: a tank main body of a fuel tank; a cylindrical body, forming a filler port, disposed at an upper portion of the tank main body; a first mounting portion formed on an outer peripheral surface of the cylindrical body projecting from the upper portion of the tank main body; and a tank cover mounted on the first mounting portion so as to cover at least the upper portion of the fuel tank.

According to this configuration, since the cylindrical body forming the filler port is configured as a member separate from a tank main body of the fuel tank, a desired degree of roundness of the filler port can be easily ensured. As a result, the appearance of the filler port from a rider is enhanced. In addition, the first mounting portion is formed on the outer peripheral surface of the cylindrical body, and the tank cover is mounted on the first mounting portion. Therefore, the tank cover is easily mounted.

In the present invention, the tank main body is preferably configured by joining an upper plate that is laterally divided into two sections and a bottom plate that is a single member. According to this configuration, a fuel tank having a complicated shape can be easily formed, and therefore, the degree of freedom in the shape of the fuel tank increases. Meanwhile, since the upper plate is laterally divided into two sections, it is difficult to form the filler port in a perfect circle shape. However, since the filler port is formed by the cylindrical body which is a member separate from the upper plate, a desired degree of roundness of the filler port can be easily ensured.

In the present invention, preferably, an intermediate portion, in a front-rear direction of the motorcycle, of the tank cover is mounted on the first mounting portion, a front portion of the tank cover is fitted to a key cylinder, and a rear portion of the tank cover is mounted on a second mounting portion on a rear portion of the tank main body. According to this configuration, since the tank cover is supported at the front portion, the intermediate portion, and the rear portion thereof, the tank cover is stably supported.

In this case, a pair of right and left shrouds are preferably engaged with both side portions of the tank cover. According to this configuration, since the shrouds are merely brought into engagement with the tank cover, the shrouds are easily mounted.

In the case where the shrouds are engaged with the tank cover, inner shrouds are preferably mounted on the shrouds so as to cover a gap between the tank cover and the fuel tank. According to this configuration, since the gap between the tank cover and the tank main body is covered with the inner shrouds, the appearance of the motorcycle improves.

In the case where the inner shrouds are mounted on the shrouds, the inner shrouds are preferably fastened to the shrouds. According to this configuration, the inner shrouds are easily mounted and also stably supported.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. In this specification, the terms "left side" and "right side" are the left side and the right side, respectively, as viewed from a rider on a vehicle.

Figure 1:
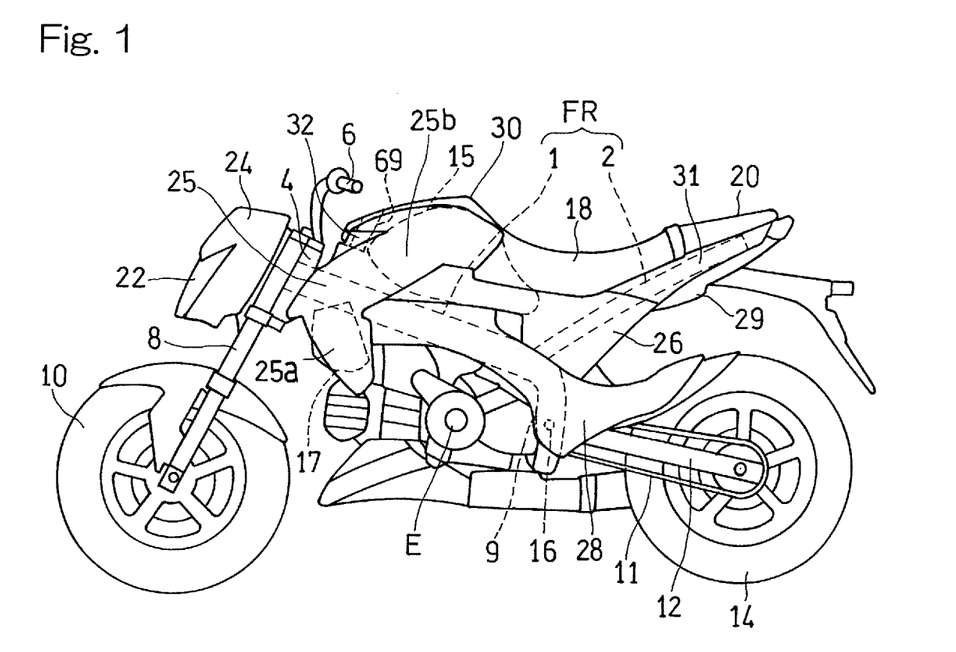
FIG. 1 is a side view showing a motorcycle including a fuel tank structure according to a first embodiment of the present invention.

FIG. 1 is a side view of a motorcycle including a fuel tank structure according to a first embodiment of the present invention. A motorcycle frame structure FR for the motorcycle includes a main frame 1 that forms a front half of the motorcycle frame structure FR, and a rear frame 2 that forms a rear half of the motorcycle frame structure FR. A head pipe 4 is provided at a front end of the main frame 1, and a front fork 8 is rotatably supported by the head pipe 4 through a steering shaft (not shown). A steering handle 6 is fixed to an upper end portion of the front fork 8, and a front wheel 10 is fitted to a lower end portion of the front fork 8.

A swingarm bracket 9 is provided at a rear end portion of the main frame 1. A swingarm 12 is supported by the swingarm bracket 9 for swing movement in a vertical direction about a pivot shaft 16 that is mounted to the swingarm bracket 9. A rear wheel 14 is rotatably supported by a rear end portion of the swingarm 12.

An engine E is fitted to a lower portion of the main frame 1 at the front side of the swingarm bracket 9. The engine E drives the rear wheel 14 through a drive chain 11. In the present embodiment, the engine E is an air-cooled single-cylinder engine. However, the type of the engine E is not limited thereto. An air cleaner 17 is disposed above a front portion of the engine E. The air cleaner 17 purifies outside air to generate clean air. The clean air having passed through the air cleaner 17 is introduced as intake air into the engine E.

A fuel tank 15 is disposed on an upper portion of the main frame 1, and a rider's seat 18 and a passenger's seat 20 are supported by the rear frame 2. That is, the fuel tank 15 is disposed between the head pipe 4 and the rider's seat 18. A key cylinder 69 is disposed frontward of the fuel tank 15 and rearward of the head pipe 4. In addition, a headlamp 22 and a front fairing 24, made of a resin and covering the headlamp 22, are disposed at a vehicle body front portion, specifically, frontward of the front fork 8, and are supported by the front fork 8. That is, the motorcycle according to the present embodiment is a so-called bikini cowl type motorcycle in which the directions of the headlamp 22 and the small-size front fairing 24 change in response to a steering angle.

A pair of right and left shrouds 25 made of a resin are disposed rearward of the front fairing 24, more specifically, rearward of the front fork 8. Each shroud 25 has substantially a V shape opened rearward in a side view, and includes a shroud portion 25a extending inclined rearward and downward from a front end portion, and a tank side cover portion 25b extending inclined rearward and upward from the front end portion. The shroud portion 25a covers the air cleaner 17 above the front portion of the engine E from the outer lateral side, and the tank side cover portion 25b covers a side portion of a front portion and a side portion of an upper portion of an intermediate portion of the fuel tank 15.

A pair of right and left side covers 26 made of a resin are disposed rearward of the tank side cover portions 25b of the shrouds 25. Each side cover 26 covers a lower portion of the fuel tank 15 and an area below a front portion of the rider's seat 18 from the outer lateral side. A pair of right and left pivot covers 28 made of a resin are disposed rearward of the shroud portions 25a of the shrouds 25 and below the side covers 26. Each pivot cover 28 covers the main frame 1, the swingarm bracket 9 and the pivot shaft 16 from the outer lateral side. A pair of right and left rear covers 31 made of a resin are disposed rearward of the side covers 26 and below the passenger's seat 20. Each rear cover 31 covers a rear portion of the rider's seat 18 and an area between the passenger's seat 20 and a rear fender 29 from the outer lateral side.

A tank upper portion cover 30 that is an example of a tank cover is disposed above the tank side cover portions 25b of the shrouds 25. The tank upper portion cover 30 covers at least the upper surface of the fuel tank 15, and may cover the upper surface and an upper portion of each side surface of the fuel tank 15. In this case, the sizes of the tank side cover portions 25b of the shrouds 25 are reduced. The tank upper portion cover 30 covers an upper portion of the fuel tank 15 from above. In addition, a pair of right and left inner shrouds 32 made of a resin are disposed frontward of the shrouds 25 and below a front end portion of the tank upper portion cover 30 so as to cover a gap between the tank upper portion cover 30 and the fuel tank 15.

Figure 2:
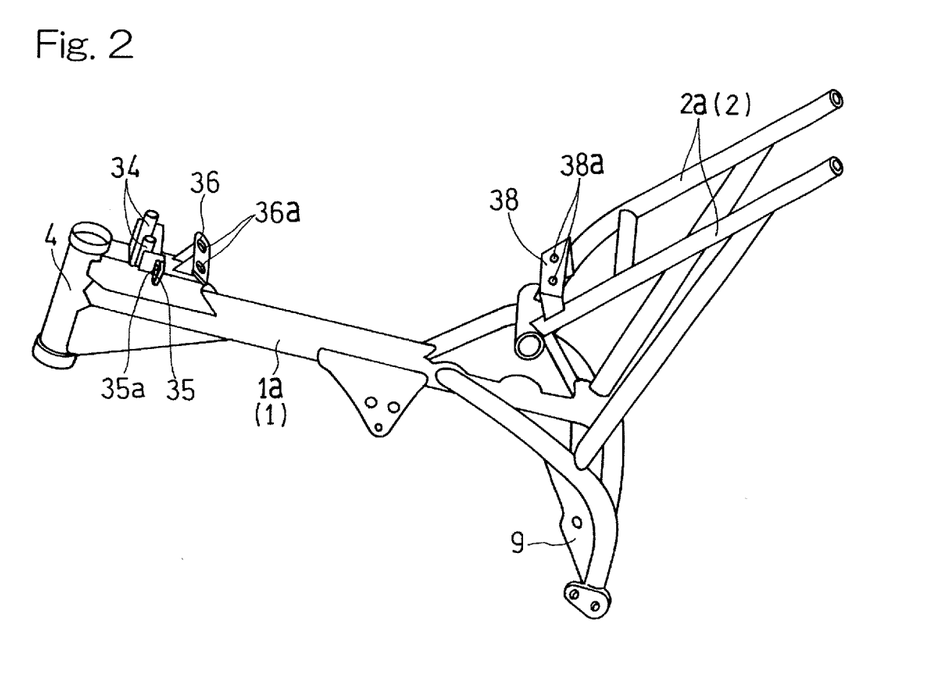
FIG. 2 is a perspective view showing a motorcycle frame structure of the motorcycle.

As shown in FIG. 2, the main frame 1 includes one cylindrical pipe 1a extending rearward and obliquely downward from the head pipe 4. Meanwhile, the rear frame 2 includes a pair of right and left cylindrical pipes 2a, 2a extending rearward and obliquely upward from a rear end portion of the main frame 1. Two pillars 34 are fixedly attached to a front end portion of the cylindrical pipe 1a of the main frame 1 by means of welding so as to project upward.

A first tank mounting portion 36 is mounted on a front portion of the cylindrical pipe 1a of the main frame 1 and rearward of the pillars 34 by means of welding. The first tank mounting portion 36 is composed of a sheet metal, and pin insertion holes 36a are formed in the first tank mounting portion 36 so as to be directed rearward and obliquely upward. Two pin insertion holes 36a are formed so as to be aligned in the vehicle widthwise direction. A cover mounting portion 35 is provided at each of both sides of the pillars 34. Each cover mounting portion 35 is composed of a sheet metal, and a cover mounting hole 35a is formed therein so as to be directed frontward and obliquely upward.

A second tank mounting portion 38 is provided at a front end portion of the rear frame 2 so as to connect the cylindrical pipes 2a, 2a of the rear frame 2. The second tank mounting portion 38 is composed of a sheet metal, and extends in the vehicle widthwise direction, so as to be connected at both end portions thereof to the right and left cylindrical pipes 2a, 2a, respectively, by means of welding. First threaded holes 38a are formed in the second tank mounting portion 38 so as to be directed in the vertical direction. In the present embodiment, two first threaded holes 38a are formed by weld nuts so as to be aligned in the vehicle widthwise direction.

Figure 3:
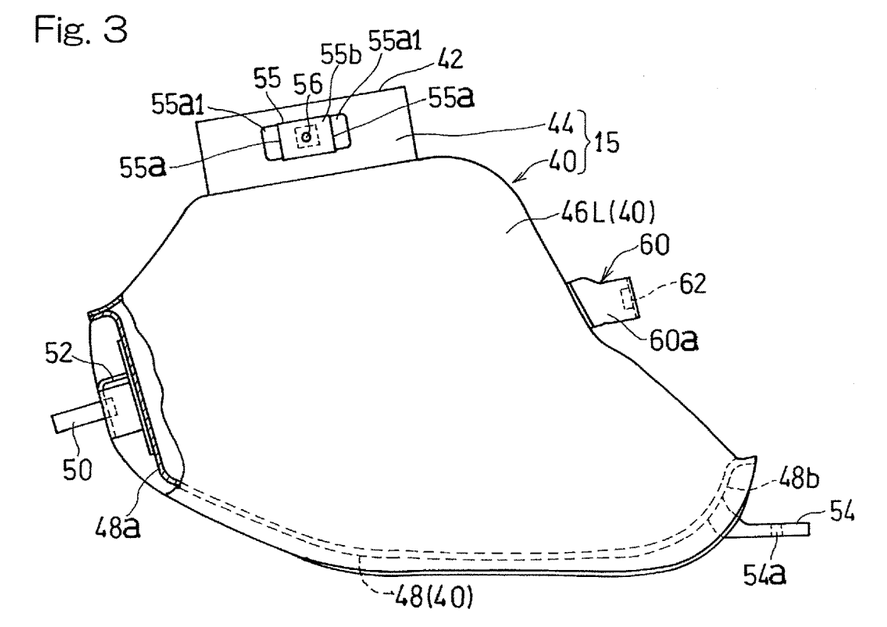
FIG. 3 is a side view showing a fuel tank of the motorcycle.
Figure 4:
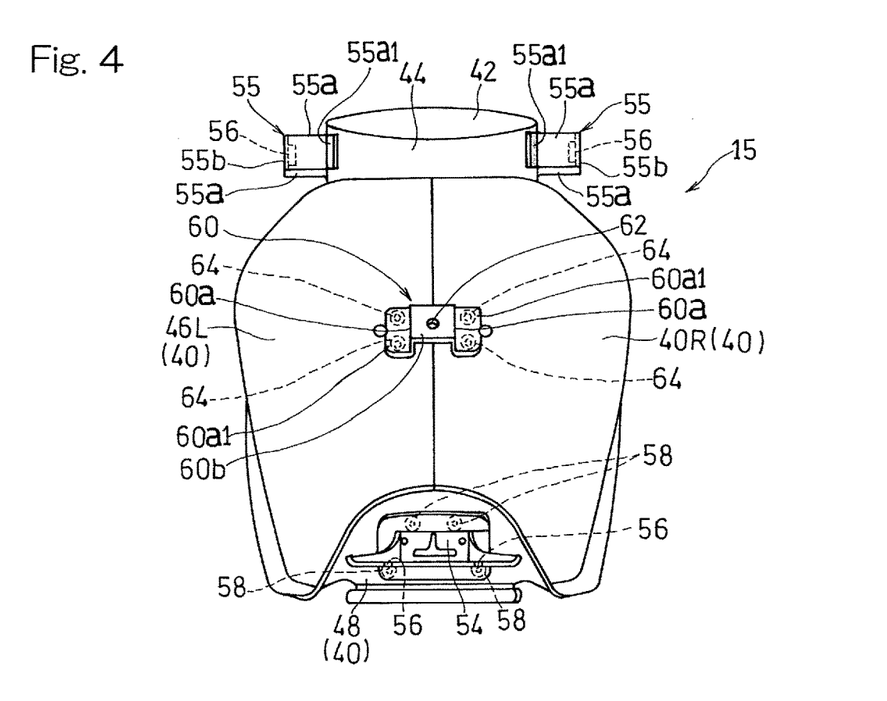
FIG. 4 is a rear view showing the fuel tank.

FIGS. 3 and 4 are a side view and a rear view of the fuel tank 15, respectively. As shown in FIG. 3, the fuel tank 15 includes a tank main body 40 in which fuel is stored, and a cylindrical body 44 forming a filler port 42. As shown in FIG. 4, the tank main body 40 includes an upper plate 46 forming the outer peripheral surface and the upper surface of the tank 15, and a bottom plate 48 forming the bottom surface of the tank 15. Furthermore, the upper plate 46 is configured by joining a left tank half body 46L and a right tank half body 46R. That is, the tank main body 40 is obtained by joining the upper plate 46 which is laterally divided into two sections and the bottom plate 48 which is a single member.

The cylindrical body 44 is fixedly attached to an upper portion of the tank main body 40 by means of welding. The cylindrical body 44 is disposed so as to extend over the left and right tank half bodies 46L and 46R. First mounting portions 55 are formed on the outer peripheral surface of the cylindrical body 44 projecting from the upper portion of the tank main body 40. Specifically, a pair of first mounting portions 55, 55 are provided at both side portions, in the vehicle widthwise direction, of the outer peripheral surface of the cylindrical body 44. Each first mounting portion 55 is formed in a flanged U shape, in which two leg portions 55a, 55a and a base portion 55b are provided, by bending a plate material. Each of the first mounting portion 55 is joined at flanges 55a1 of the two leg portions 55a, 55a thereof shown in FIG. 3 to the outer peripheral surface of the cylindrical body 44 by means of welding. A second threaded hole 56 is formed in the base portion 55b so as to be directed in the vehicle widthwise direction. In the present embodiment, the second threaded hole 56 is formed by a weld nut joined to the base portion 55b.

A front portion 48a of the bottom plate 48 is bent upward to form a portion of a front surface that can be seen from front of the tank main body 40. Similarly, a rear portion 48b of the bottom plate 48 is also bent upward to form a portion of a rear surface that can be seen from rear of the tank main body 40.

Pins 50 are provided on the front portion 48a of the bottom plate 48 so as to project frontward. Two pins 50 are provided so as to be aligned in the vehicle widthwise direction and are mounted on the front portion 48a of the bottom plate 48 via a mounting piece 52 composed of a plate material. The mounting piece 52 is mounted to the bottom plate 48, for example, by means of spot welding.

A support piece 54 is provided on the rear portion 48b of the bottom plate 48 so as to project rearward. The support piece 54 is composed of a sheet metal having a flat surface that faces upward, and first screw insertion holes 54a are formed in the support piece 54 so as to be directed in the vertical direction. Two first screw insertion holes 54a are formed so as to be aligned in the vehicle widthwise direction. The support piece 54 is mounted on the rear portion 48b of the bottom plate 48 by means of spot welding 58. In the present embodiment, the spot welding 58 is performed at four places.

A second mounting portion 60 is provided on the rear surface of the tank main body 40 of the fuel tank 15. The second mounting portion 60 is formed in a flanged U shape, in which tow leg portions 60a, 60a and a base portion 60b are provided, by bending a plate material. The second mounting portion 60 is joined at flanges 60a1 of the two leg portions 60a, 60a to the tank main body 40, and a third threaded hole 62 is formed in the base portion 60b so as to be directed in the front-rear direction or longitudinal direction of the motorcycle. In the present embodiment, the third threaded hole 62 is formed by a weld nut joined to the base portion 60b.

The second mounting portion 60 is disposed so as to extend over the left and right tank half bodies 46L and 46R. Specifically, the left leg portion 60a of the second mounting portion 60 is joined to the left tank half body 46L, and the right leg portion 60a of the second mounting portion 60 is joined to the right tank half body 46R. In the present embodiment, the second mounting portion 60 is mounted on the tank main body 40 by means of spot welding 64. In the present embodiment, the spot welding 64 is performed at four places.

Figure 5:
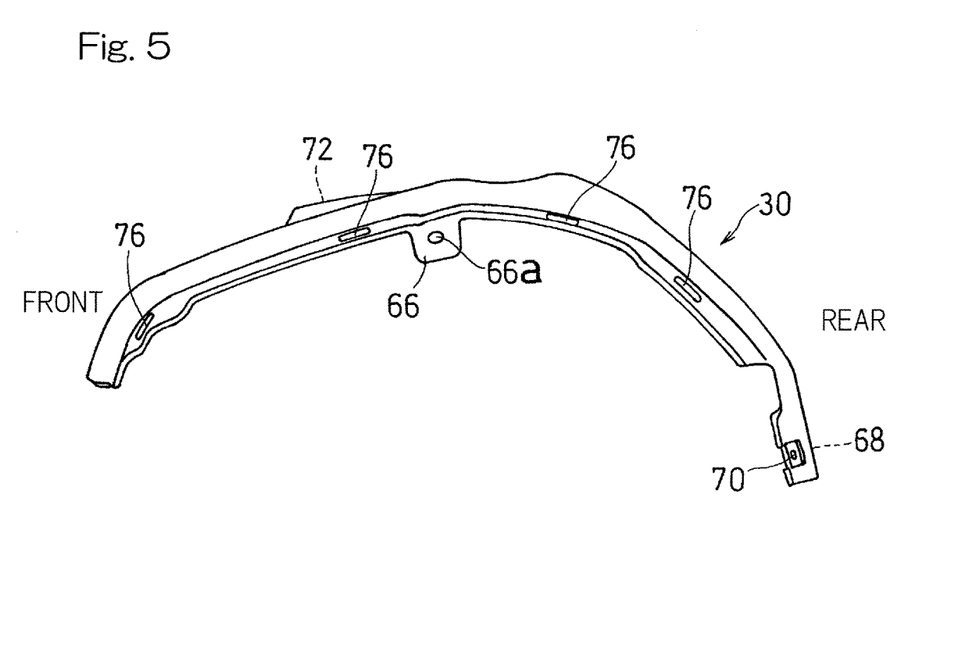
FIG. 5 is a side view showing a tank upper portion cover of the motorcycle.
Figure 6:
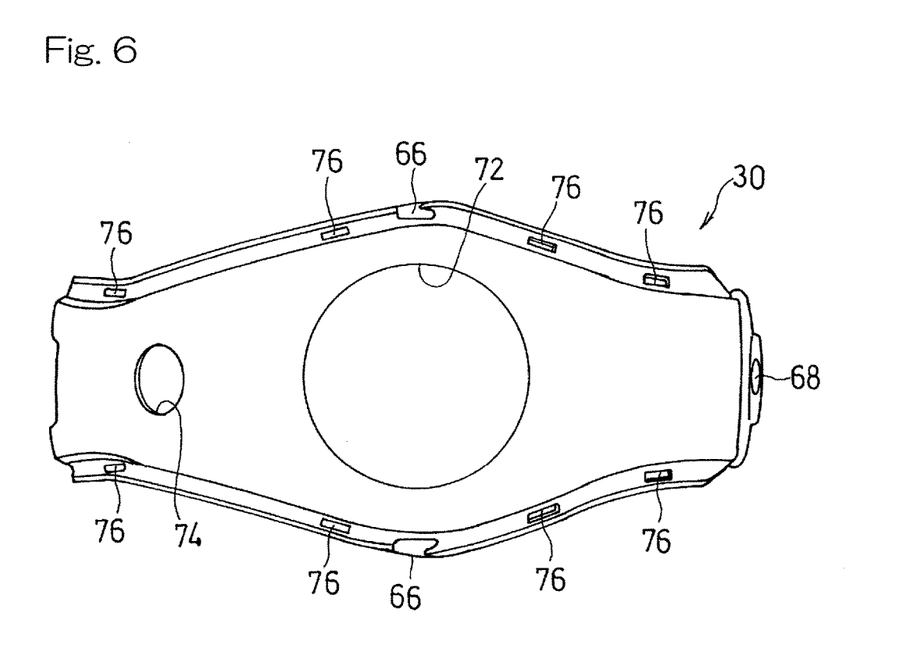
FIG. 6 is a bottom view showing the tank upper portion cover.

FIGS. 5 and 6 are a side view and a bottom view of the tank upper portion cover 30, respectively. As shown in FIG. 5, the tank upper portion cover 30 has a bow shape curved upward from a front end thereof toward a rear end thereof along the shape of the fuel tank 15 in a side view. A mounting piece 66 is formed on an intermediate portion, in the longitudinal direction, of the tank upper portion cover 30 so as to project downward. The mounting piece 66 is provided at each of both side edges in the vehicle widthwise direction. Each mounting piece 66 has a second screw insertion hole 66a formed therein so as to be directed in the vehicle widthwise direction.

A third screw insertion hole 68 shown in FIG. 6 is formed in an intermediate portion, in the vehicle widthwise direction, of a rear end portion of the tank upper portion cover 30 so as to be directed in the longitudinal direction. In addition, a shroud mounting hole 70 in FIG. 5 is formed in the rear end portion of the tank upper portion cover 30 and at each of both sides of the third screw insertion hole 68 so as to be directed rearward.

As shown in FIG. 6, a cover through hole 72 forming the filler port 42 is formed in a center portion, in the longitudinal direction, of the tank upper portion cover 30. A key cylinder insertion hole 74 is formed in a front portion of the tank upper portion cover 30. The axis of the key cylinder insertion hole 74 extends upward so as to be tilted slightly rearward. A plurality of first engagement grooves 76 are formed in each of both side portions, in the vehicle widthwise direction, of the tank upper portion cover 30. Each first engagement groove 76 is a slot that is elongated in the longitudinal direction. In the present embodiment, four first engagement grooves 76 are formed in each of both side portions in the vehicle widthwise direction so as to be aligned in the longitudinal direction. However, the shapes and the number of the first engagement grooves 76 are not limited thereto.

Figure 7:
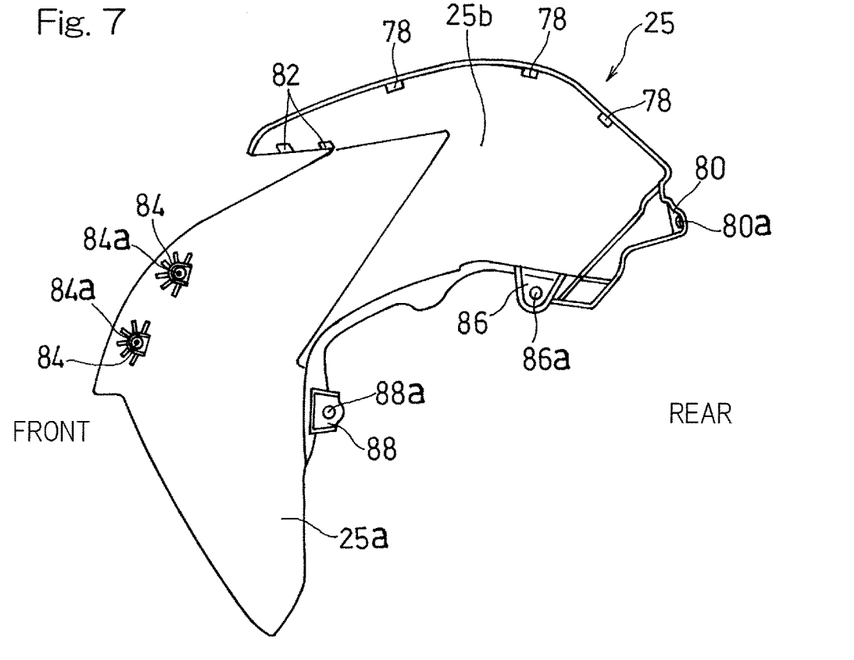
FIG. 7 is an inside view showing a shroud of the motorcycle.

FIG. 7 is an inside view of the shroud 25 as seen from the inner side in the vehicle widthwise direction. The shapes of the right and left shrouds 25, 25 are laterally symmetrical to each other. Thus, here, only the right shroud 25 will be described, and the description of the left shroud 25 is omitted. First engagement pieces 78 are formed at an upper edge portion of the tank side cover portion 25b of the shroud 25 so as to project downward. Three first engagement pieces 78 are formed so as to be aligned in the longitudinal direction. A shroud mounting piece 80 is provided at a rear end portion of the tank side cover portion 25b, and a fourth screw insertion hole 80a is formed in the shroud mounting piece 80 so as to be directed in the longitudinal direction.

Second engagement pieces 82 are formed at an upper portion of the tank side cover portion 25b and frontward of and below the first engagement pieces 78 so as to project downward. Two second engagement pieces 82 are formed at a front end portion of the upper portion of the shroud 25 so as to be aligned in the longitudinal direction. Bosses 84 are provided at the front end portion of the upper portion of the shroud 25 and below the second engagement pieces 82 so as to project inward from the inner surface of the shroud 25. Two bosses 84 are formed so as to be aligned in the vertical direction. A fourth threaded hole 84a is formed in each boss 84 so as to be directed in the vehicle widthwise direction.

A side cover mounting piece 86 is provided at a lower edge of a rear portion of the tank side cover portion 25b so as to project downward. A side cover mounting hole 86a is formed in the side cover mounting piece 86 so as to be directed in the vehicle widthwise direction. A pivot cover mounting piece 88 is provided at the rear edge of the shroud portion 25a so as to project rearward. A pivot cover mounting hole 88a is formed in the pivot cover mounting piece 88 so as to be directed in the vehicle widthwise direction.

Figure 8:
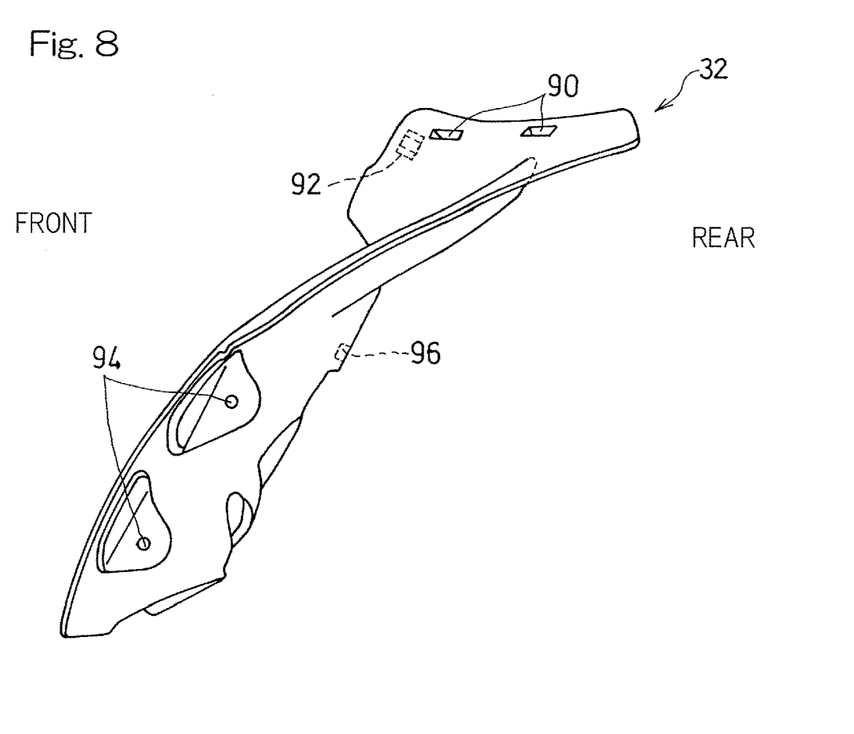
FIG. 8 is a side view showing an inner shroud of the motorcycle.

FIG. 8 is a side view of the inner shroud 32. The shapes of the right and left inner shrouds 32, 32 are laterally symmetrical to each other. Thus, here, only the left inner shroud 32 will be described, and the description of the right inner shroud 32 is omitted. The inner shroud 32 has a shape extending rearward and obliquely upward along the front edge of the tank side cover portion 25b of the shroud 25. Second engagement grooves 90 are formed in an upper end portion of the inner shroud 32. Each second engagement groove 90 is a slot that is elongated in the longitudinal direction. In the present embodiment, two second engagement grooves 90 are formed so as to be aligned in the longitudinal direction. An insertion piece 92 is formed at an upper end portion of the inner shroud 32 and frontward of the second engagement grooves 90 so as to project downward.

Fifth screw insertion holes 94 are formed in a lower portion of the inner shroud 32 so as to be directed in the vehicle widthwise direction. Two fifth screw insertion holes 94 are formed so as to be aligned in the vertical direction. A sixth screw insertion hole 96 is formed in the inner shroud 32 above and obliquely rearward of the upper fifth screw insertion hole 94 so as to be directed rearward and obliquely downward.

Figure 9:
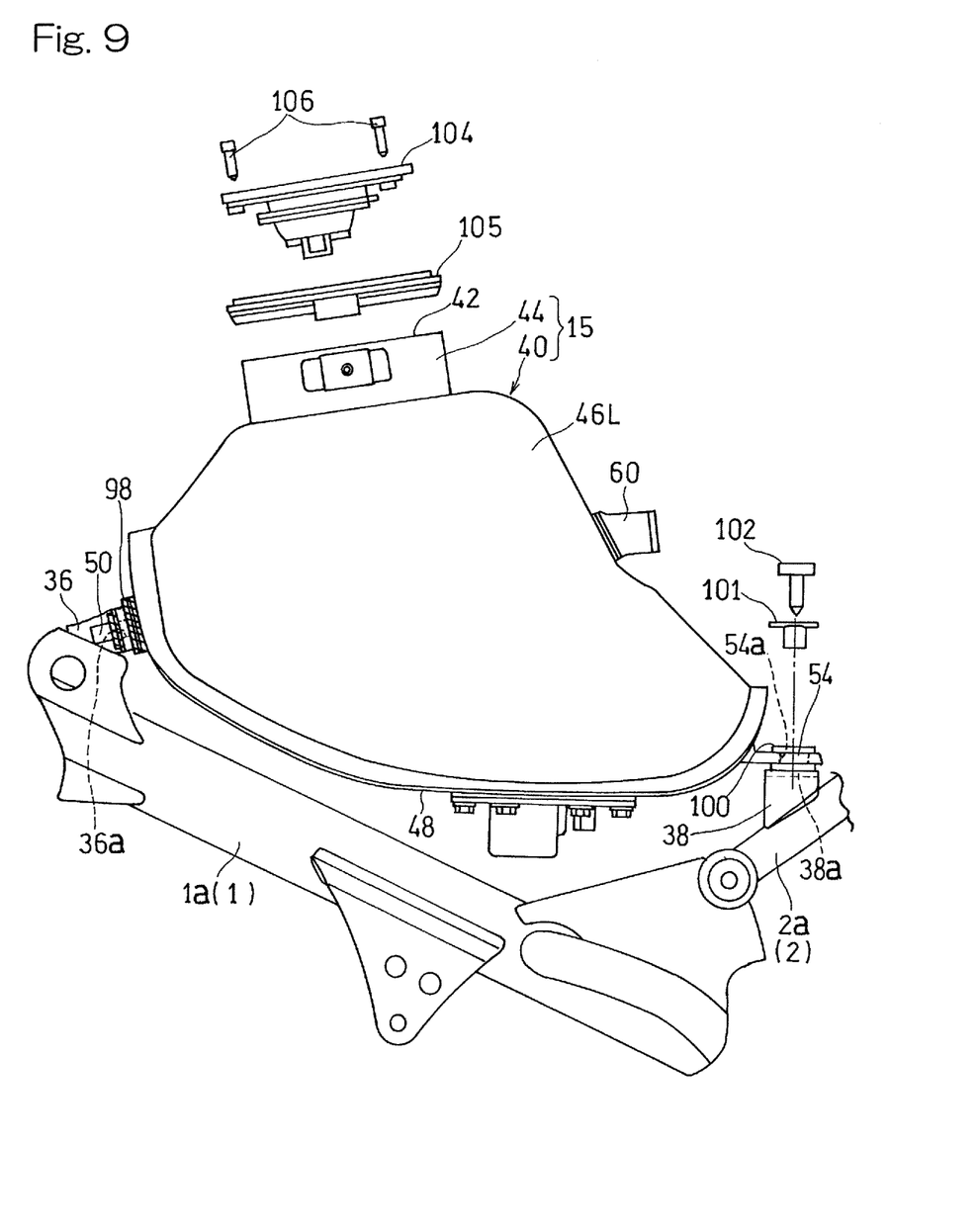
FIG. 9 is an exploded side view showing a situation where the fuel tank is being mounted.

Mounting each component to a vehicle body will be described. First, in mounting the fuel tank 15, tubular elastic members 98 such as grommets are mounted to the pin insertion holes 36a of the first tank mounting portion 36, which is provided at the main frame 1, as shown in FIG. 9. The pins 50 on the tank main body 40 of the fuel tank 15 are fitted into the elastic members 98. Accordingly, a front portion of the fuel tank 15 is supported by the main frame 1.

Subsequently, tubular elastic members 100 such as grommets having flanges at both ends thereof are mounted to the first screw insertion holes 54a of the support piece 54 on the tank main body 40. Cylindrical collars 101 having a flange at one end thereof are fitted into the elastic members 100. Furthermore, bolts 102 are inserted into the collars 101 from above, and tightened into the first threaded holes 38a of the second tank mounting portion 38, which is provided on the rear frame 2. Accordingly, a rear portion of the fuel tank 15 is supported by the rear frame 2.

Therefore, a tank cap 104 is mounted to the cylindrical body 44. The tank cap 104 is mounted to the cylindrical body 44 via a tamper 105 by means of a plurality of bolts 106 (three in the present embodiment). The bolts 106 are screwed into threaded holes (not shown) in bosses provided inside the cylindrical body 44.

Figure 10:
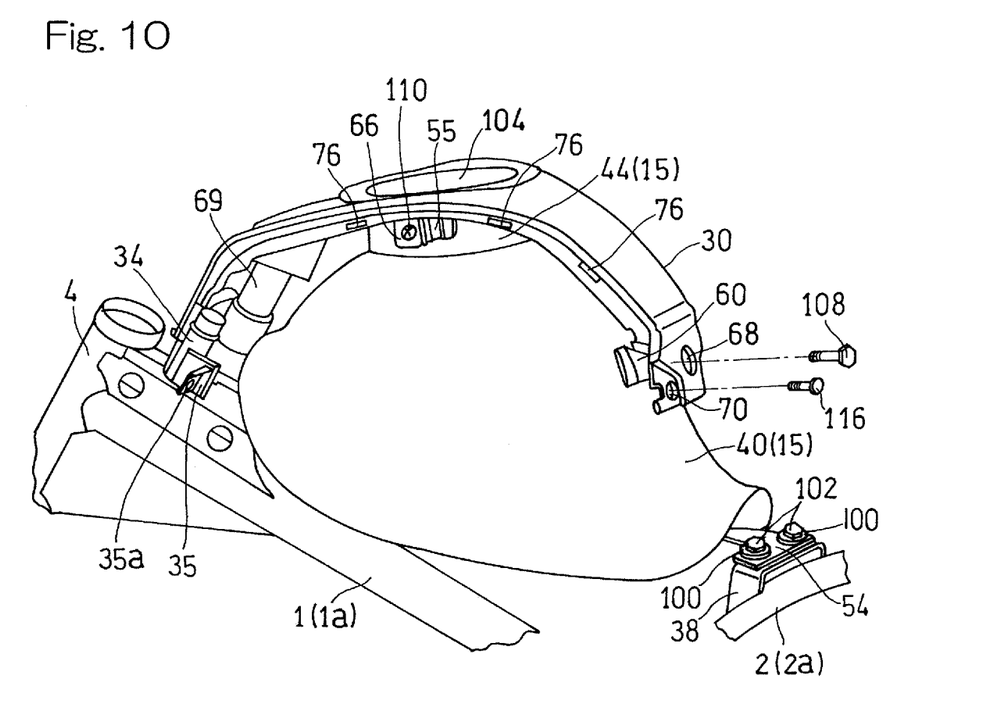
FIG. 10 is a perspective view showing a situation where the tank upper portion cover is being mounted.
Figure 11:
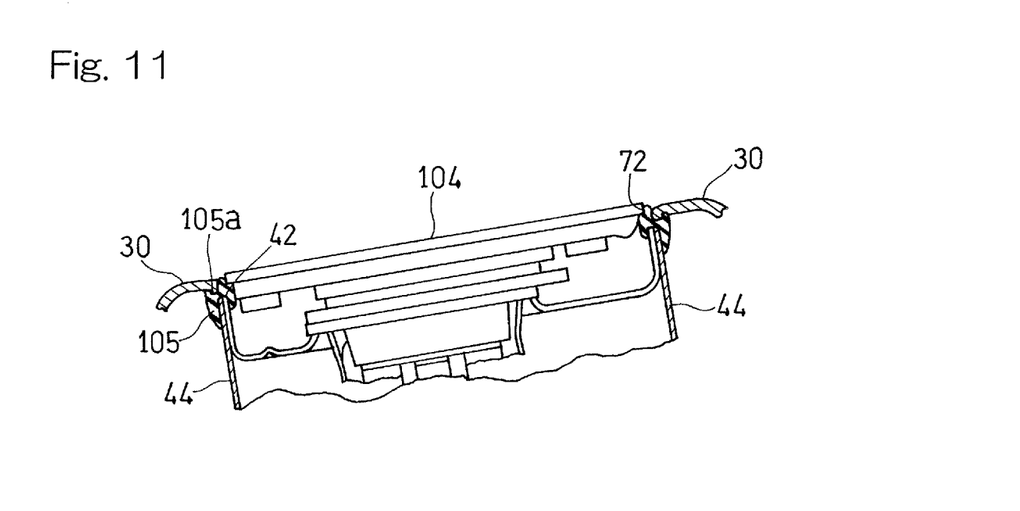
FIG. 11 is a longitudinal cross-sectional view showing a tank cap mounting portion of the fuel tank.

Then, the tank upper portion cover 30 shown in FIG. 10 is mounted to the vehicle body. Before this, the key cylinder 69 is mounted to the pillars 34 on the main frame 1. Subsequently, the tank upper portion cover 30 is placed on the upper portion of the fuel tank 15 from above such that the key cylinder 69 is inserted through the key cylinder insertion hole 74 (FIG. 6) of the tank upper portion cover 30. A rubber damper (not shown) is interposed between the tank upper portion cover 30 and the key cylinder 69. Furthermore, as shown in FIG. 11, the edge portion of the cover through hole 72 of the tank upper portion cover 30 is fitted to an annular groove 105a of the damper 105.

A screw body 108 is inserted into the third screw insertion hole 68 of the tank upper portion cover 30 shown in FIG. 10 from the rear side, and is tightened into the third threaded hole 62 (FIG. 3) of the second mounting portion 60 on the tank main body 40. A screw body 110 shown in FIG. 10 is inserted into the second screw insertion hole 66a of each mounting piece 66 on the tank upper portion cover 30 shown in FIG. 5 from the outer lateral side, and is tightened into the second threaded hole 56 (FIG. 3) of the corresponding first mounting portion 55 on the cylindrical body 44. In this manner, the tank upper portion cover 30 is engaged at the front portion thereof to the key cylinder 69, is mounted at an intermediate portion thereof in the longitudinal direction to each first mounting portion 55 on the fuel tank 15, and is mounted at the rear portion thereof to the second mounting portion 60 of the fuel tank 15.

Figure 12:
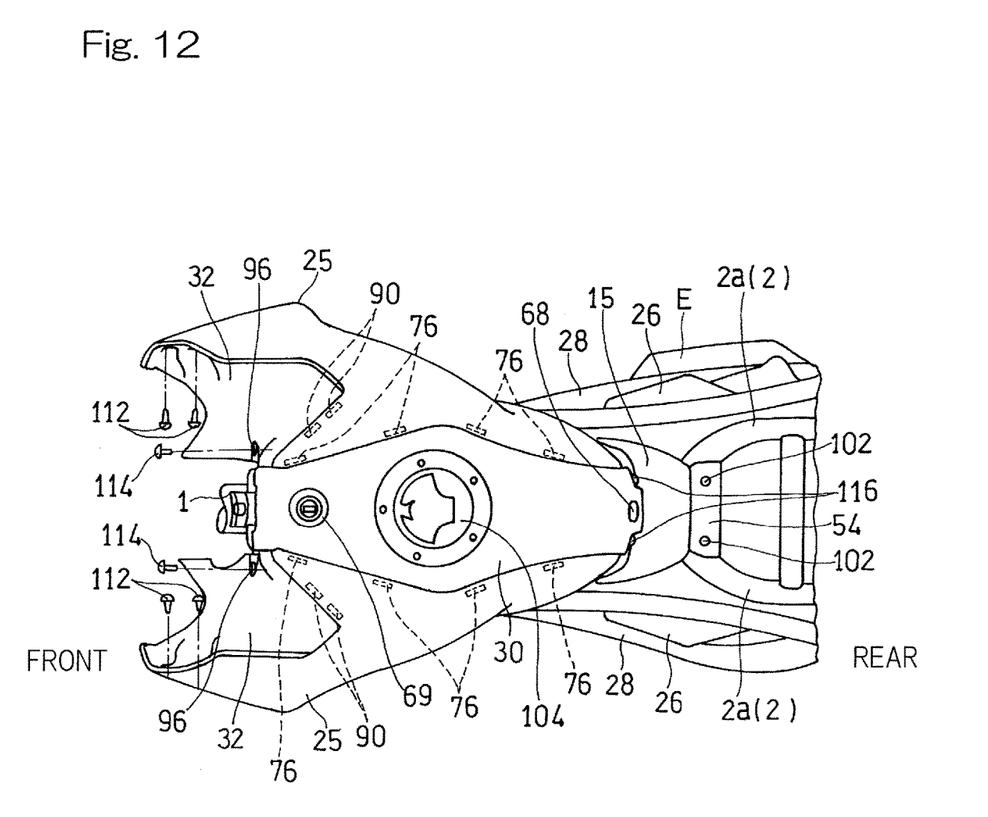
FIG. 12 is a plan view showing the tank cap mounting portion of the fuel tank.

Then, the shrouds 25 and the inner shrouds 32 shown in FIG. 12 are mounted to the vehicle body. First, each inner shroud 32 is mounted to the corresponding shroud 25 to assemble a shroud assembly. The second engagement pieces 82 on the shroud 25 shown in FIG. 7 are inserted into the second engagement grooves 90 of the inner shroud 32 shown in FIG. 8 from above to be engaged therewith. Furthermore, screw bodies 112 shown in FIG. 12 are inserted into the fifth screw insertion holes 94 of the inner shroud 32 shown in FIG. 8 from the inner side in the vehicle widthwise direction, and are tightened into the fourth threaded holes 84a provided in the bosses 84 on the shroud 25 shown in FIG. 7. In this manner, the shroud assembly is formed.

Each shroud assembly is brought into engagement with the first engagement grooves 76 of the tank upper portion cover 30 shown in FIG. 12. Specifically, the insertion piece 92 on the inner shroud 32 shown in FIG. 8 is inserted into the frontmost first engagement groove 76 of the four first engagement grooves 76 from above to be engaged therewith, and the first engagement pieces 78 on the shroud 25 shown in FIG. 7 are inserted into the other three first engagement grooves 76 (FIG. 12) from above to be engaged therewith. Accordingly, the shroud assembly is positioned. In addition to this, for example, projection-like dampers (not shown) may be provided on side surfaces of the fuel tank 15 and the air cleaner 17 shown in FIG. 1, fitting holes (not shown) into which the dampers are to be fitted may be provided in the inner surface of each shroud 25, and each shroud 25 may be supported by the fuel tank 15 and the air cleaner 17 by inserting the dampers into the fitting holes.

In this state, fastening bodies 114 shown in FIG. 12 such as rivets are inserted into the sixth insertion holes 96 of the inner shrouds 32 from the front side and are mounted into the cover mounting holes 35a provided in the cover mounting portions 35 on the main frame 1 shown in FIG. 10. Furthermore, screw bodies 116 are inserted into the shroud mounting holes 70 of the tank upper portion cover 30 and the fourth screw insertion holes 80a (FIG. 7) of the shrouds 25 in this order from the rear side of the vehicle body, and are fastened by nuts (not shown). In this manner, each shroud assembly is mounted to the vehicle body.

Thereafter, projections-like dampers (not shown) provided on a front end portion of each side cover 26 shown in FIG. 1 and a front end portion of each pivot cover 28 are inserted into the side cover mounting hole 86a of the side cover mounting piece 86 and the pivot cover mounting hole 88a of the pivot cover mounting piece 88 on the shroud 25 in FIG. 7, respectively. Accordingly, the front end portion of each side cover 26 and the front end portion of each pivot cover 28 are supported by the vehicle body via the shroud 25.

As shown in FIG. 4, the tank main body 40 of the fuel tank 15 of the present embodiment is configured by joining the bottom plate 48 and the upper plate 46 which is laterally divided into two sections. Thus, a fuel tank having a complicated shape can be easily formed, and therefore, the degree of freedom in the shape of design of the fuel tank increases. As a result, the fuel tank is easily installed in a limited space, and the tank capacity is easily increased.

On the other hand, when the upper plate 46 is laterally divided into two sections, it becomes difficult to form the filler port 42 in a perfect circle shape. In the motorcycle in which the fuel tank 15 is disposed between the head pipe 4 and the rider's seat 18 as shown in FIG. 1, the filler port 42 is easily seen from the rider, and thus the filler port 42 is desirably close to a perfect circle in terms of appearance.

In the above configuration, since the filler port 42 is formed by the cylindrical body 44, which is a member separate from the upper plate 46, as shown in FIG. 3, a desired degree of roundness of the filler port 42 can be easily ensured. Therefore, the appearance of the filler port 42 from the rider is enhanced.

As shown in FIG. 11, the tank upper portion cover 30 has the cover through hole 72 forming the filler port 42, and the edge portion of the cover through hole 72 is fitted to the annular groove 105a of the damper 105. In order to prevent the edge portion of the cover through hole 72 from being disengaged or rising from the annular groove 105a due to vibration during travelling, it is desirable to fix the tank upper portion cover 30 in the vicinity of the annular groove 105a. However, when a cover support portion is provided to the tank main body 40, it is necessary to form the tank upper portion cover 30 in such a large size as to extend to the lower side, or cause the mounting pieces to greatly project to the lower side.

In the above configuration, as shown in FIG. 10, the first mounting portions 55 are formed on the outer peripheral surface of the cylindrical body 44, and the intermediate portion, in the longitudinal direction, of the tank upper portion cover 30 is mounted on the first mounting portions 55. Therefore, the tank upper portion cover 30 is easily mounted, and increasing in size of the tank upper portion cover 30 and the mounting piece 66 can be inhibited. In addition to mounting the intermediate portion, in the longitudinal direction, of the tank upper portion cover 30 to the first mounting portions 55, the front portion of the tank upper portion cover 30 is fitted to the key cylinder 69, and the rear portion of the tank upper portion cover 30 is mounted on the second mounting portion 60 on the fuel tank 15. Therefore, the tank upper portion cover 30 is stably supported.

As shown in FIG. 12, the first engagement pieces 78 (FIG. 7) of the pair of the right and left shrouds 25 are engaged with the engagement grooves 76 in both side portions of the tank upper portion cover 30. Accordingly, the shroud assemblies including the shrouds 25 are easily positioned. As a result, an operation of mounting the shroud assemblies to the vehicle body becomes easy.

In addition, since the gap between the tank upper portion cover 30 and the fuel tank 15 is covered with the inner shrouds 32 mounted on the shrouds 25, the appearance of the motorcycle improves. After the inner shrouds 32 are positioned by bringing the second engagement pieces 82 (FIG. 7) of the shrouds 25 into engagement with the second engagement grooves 90, the inner shrouds 32 are fastened to the shrouds 25 by means of the screw bodies 112. Accordingly, the inner shrouds 32 are easily mounted to the shrouds 25 and stably supported.

The present invention is not limited to the above embodiment, and various additions, changes, or deletions can be made without departing from the gist of the present invention. For example, although the bikini cowl type motorcycle has been described in the above embodiment, the fuel tank structure according to the present invention is also applicable to motorcycles other than a bikini cowl type, such as a naked type motorcycle which does not include a cowling in front of a front fork, a half cowl type motorcycle and a full cowl type motorcycle, including a large-size cowling. Therefore, these are construed as included within the scope of the present invention.

REFERENCE NUMERALS

4 . . . head pipe
15 . . . fuel tank
18 . . . rider's seat (seat)
25 . . . shroud
30 . . . tank upper portion cover (tank cover)
32 . . . inner shroud
40 . . . tank main body (fuel tank)
42 . . . filler port
44 . . . cylindrical body
46 . . . upper plate
48 . . . bottom plate
55 . . . first mounting portion
60 . . . second mounting portion
69 . . . key cylinder

What is claimed is:

1. A fuel tank structure for a motorcycle which is disposed between a head pipe and a seat, the fuel tank structure comprising:

a tank main body of a fuel tank, the tank main body including a left tank half body and a right tank half body, the left and right half bodies being joined with each other;

a cylindrical body, forming a filler port, disposed at an upper portion of the tank main body;

a first mounting portion formed on an outer peripheral surface of the cylindrical body projecting from the upper portion of the tank main body, the first mounting portion being provided with a first screw insertion hole to be directed in a left-right direction of the motorcycle;

a second mounting portion provided on a rear surface of the tank main body, the second mounting portion being in the form of a U-shape having left and right leg portions and a base portion connecting the left and right leg portions, the base portion being provided with a second screw insertion hole to be directed in a front-rear direction of the motorcycle, the left leg portion being joined to the left tank half body and the right leg portion being joined to the right tank half body; and a tank cover mounted on the first mounting portion so as to cover at least the upper portion of the fuel tank, wherein an intermediate portion, in the front-rear direction of the motorcycle, of the tank cover is mounted on the first mounting portion by a first screw body being fastened to the first screw insertion hole from an outside of the tank cover in the left-right direction, a front portion of the tank cover is fitted to a key cylinder, and a rear portion of the tank cover is mounted on the second mounting portion by a second screw body being fastened to the second screw insertion hole from a rear of the tank cover in the front-rear direction.

2. The fuel tank structure as claimed in claim 1, wherein the tank main body is configured by joining an upper plate that is laterally divided into two sections and a bottom plate that is a single member.

3. The fuel tank structure as claimed in claim 1, wherein a pair of left and right shrouds are engaged with respective left and right side portions of the tank cover.

4. The fuel tank structure as claimed in claim 3, wherein left and right inner shrouds are mounted on the respective left and right shrouds so as to cover a gap between the tank cover and the fuel tank.

5. The fuel tank structure as claimed in claim 4, wherein the left and right inner shrouds are fastened to the respective left and right shrouds.

* * * * *